(12) United States Patent
Wippermann et al.

(10) Patent No.: US 10,362,229 B2
(45) Date of Patent: Jul. 23, 2019

(54) MULTI-APERTURE IMAGING DEVICE, PORTABLE DEVICE AND METHOD OF PRODUCING A MULTI-APERTURE IMAGING DEVICE

(71) Applicant: Fraunhofer-Gesellschaft zur Förderung der angewandten Forschung e.V., München (DE)

(72) Inventors: Frank Wippermann, Meiningen (DE); Andreas Brückner, Jena (DE); Andreas Bräuer, Schlöben (DE); Alexander Oberdörster, Jena (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 15/898,390

(22) Filed: Feb. 16, 2018

(65) Prior Publication Data

US 2018/0176473 A1 Jun. 21, 2018

Related U.S. Application Data

(63) Continuation of application No. PCT/EP2016/069650, filed on Aug. 18, 2016.

(30) Foreign Application Priority Data

Aug. 19, 2015 (DE) .................. 10 2015 215 844

(51) Int. Cl.
*H04N 5/232* (2006.01)
*G02B 13/00* (2006.01)
(Continued)

(52) U.S. Cl.
CPC ......... *H04N 5/23287* (2013.01); *G02B 7/021* (2013.01); *G02B 7/04* (2013.01);
(Continued)

(58) Field of Classification Search
None
See application file for complete search history.

(56) References Cited

U.S. PATENT DOCUMENTS 4,417,788 A * 11/1983 Alvarez ............... G02B 27/644
250/201.1
6,992,699 B1 1/2006 Vance et al.
(Continued)

FOREIGN PATENT DOCUMENTS

DE 102014213371 B3 11/2014
DE 102013209819 A1 8/2015
(Continued)

OTHER PUBLICATIONS

International Preliminary Report on Patentability dated Nov. 23, 2017 (English translation dated Feb. 22, 2018) issued in parallel PCT Application No. PCT/EP2016/069650 (32 pages with translation).

(Continued)

*Primary Examiner* — James M Hannett
(74) *Attorney, Agent, or Firm* — Haynes and Boone, LLP

(57) ABSTRACT

A multi-aperture imaging device includes a one-line array of adjacently arranged optical channels and beam-deflecting unit for deflecting an optical path of the optical channels. The beam-deflecting unit includes a first position and a second position between which the beam-deflecting unit is translationally moveable along a line extension direction of the one-line array. The beam-deflecting unit is configured such that it deflects the optical path of each optical channel into mutually different directions depending on whether it is located in the first position or in the second position.

25 Claims, 8 Drawing Sheets

(51) Int. Cl.
  *G02B 26/08* (2006.01)
  *H04N 5/225* (2006.01)
  *G02B 7/02* (2006.01)
  *G02B 7/04* (2006.01)
  *G02B 17/00* (2006.01)
  *G02B 27/64* (2006.01)
  *G02B 27/10* (2006.01)

(52) U.S. Cl.
  CPC ....... *G02B 13/001* (2013.01); *G02B 13/0065* (2013.01); *G02B 17/002* (2013.01); *G02B 26/0816* (2013.01); *G02B 27/646* (2013.01); *H04N 5/2254* (2013.01); *H04N 5/2258* (2013.01); *H04N 5/2259* (2013.01); *G02B 27/1066* (2013.01)

(56) References Cited

U.S. PATENT DOCUMENTS

| | | |
|---|---|---|
| 9,083,873 B1 | 7/2015 | Lewkow |
| 2003/0128917 A1* | 7/2003 | Turpin ................ G02B 6/2861 385/24 |
| 2004/0105158 A1 | 6/2004 | Grier et al. |
| 2005/0088404 A1 | 4/2005 | Heines et al. |
| 2007/0058961 A1 | 3/2007 | Kobayashi et al. |
| 2014/0055624 A1 | 2/2014 | Gaines et al. |
| 2014/0111650 A1 | 4/2014 | Georgiev et al. |
| 2015/0109468 A1 | 4/2015 | Laroia |

FOREIGN PATENT DOCUMENTS

| | | |
|---|---|---|
| JP | H10 4540 A | 1/1998 |
| JP | 2002-171430 A | 6/2002 |
| JP | 2008-180773 A | 8/2008 |
| TW | 538639 | 6/2003 |
| WO | WO 2015/015383 A2 | 2/2015 |

OTHER PUBLICATIONS

International Search Report dated Oct. 28, 2016 issued in parallel PCT Application No. PCT/EP2016/069650 (3 pages).

Office Action dated Mar. 15, 2019 issued in in the parallel Japanese patent application No. 2018-509589 (11 pages with English translation).

* cited by examiner

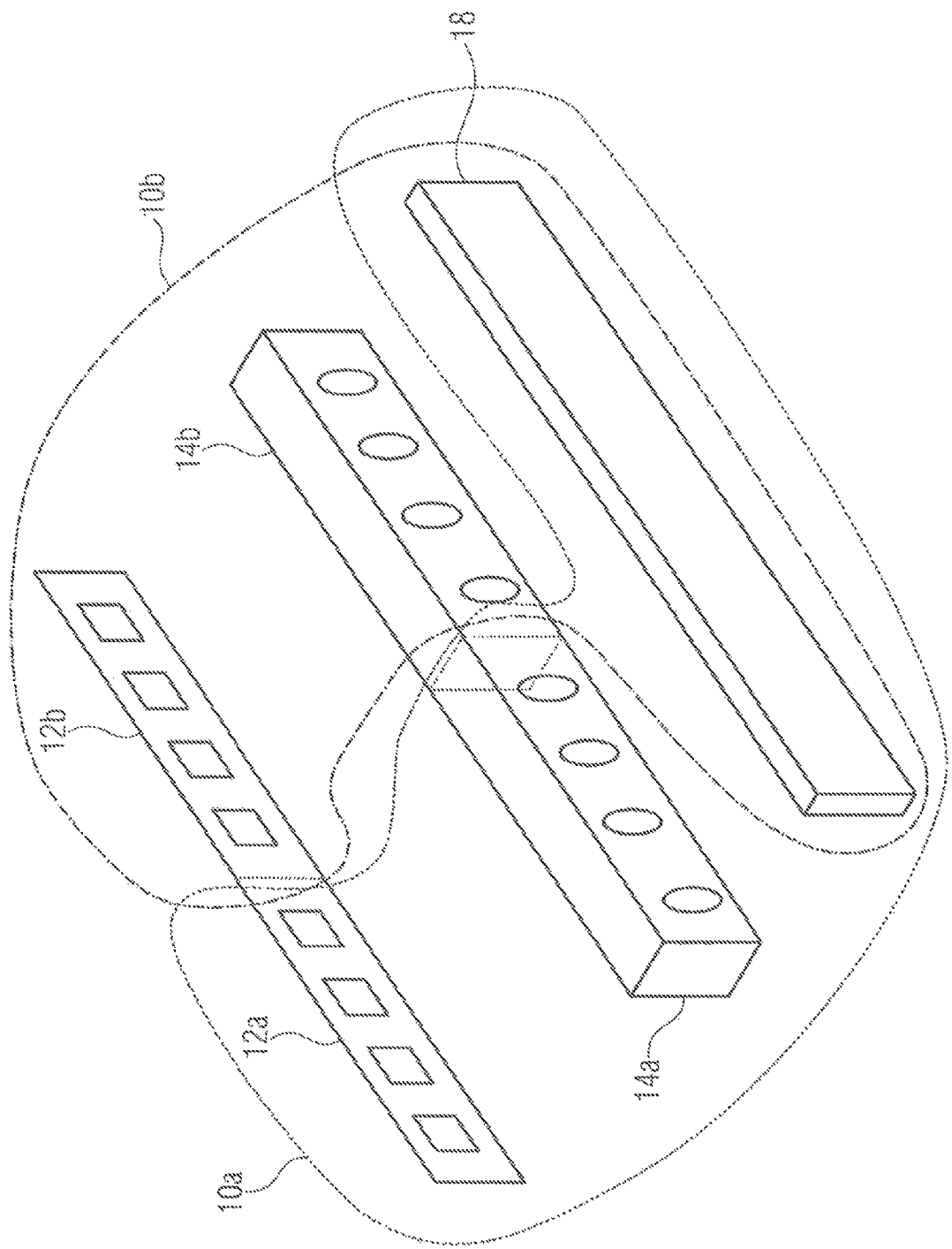

MULTI-APERTURE IMAGING DEVICE, PORTABLE DEVICE AND METHOD OF PRODUCING A MULTI-APERTURE IMAGING DEVICE

CROSS-REFERENCE TO RELATED APPLICATIONS

This application is a continuation of co-pending International Application No. PCT/EP2016/069650, filed Aug. 18, 2016, which is incorporated herein by reference in its entirety, and additionally claims priority from German Application No. 10 2015 215 844.6, filed Aug. 19, 2015, which is incorporated herein by reference in its entirety.

BACKGROUND OF THE INVENTION

The present invention relates to a multi-aperture imaging device and to a method of producing same. The present invention further relates to a portable device comprising a multi-aperture imaging device. The present invention further relates to a multi-aperture imaging system comprising a linear channel arrangement and a translationally moved deflecting mirror.

Conventional cameras transmit the total field of view within one channel and are limited in terms of their miniaturization. In smartphones, two cameras are employed which are oriented in and counter to the direction of the surface normal of the display.

A requirement placed upon devices comprising multi-aperture imaging devices consists in degrees of freedom with regard to their design, which also results in requirements placed upon cameras with regard to their miniaturization, in particular in terms of achieving a small installation height.

Therefore, what would be desirable is a concept for multi-aperture imaging devices which enables miniaturization of same, so that degrees of freedom are obtained for devices which include the multi-aperture imaging devices.

SUMMARY

According to an embodiment, a multi-aperture imaging device may have: a one-line array of adjacently arranged optical channels each including optics; a beam-deflecting unit for deflecting an optical path of the optical channels; an optical image stabilizer for performing image stabilization along a first image axis by producing a rotational movement of the beam-deflecting unit, and for translationally moving the one-line array along a line extension direction based on a translational movement for performing image stabilization along a second image axis; and the beam-deflecting unit having a first position and a second position between which the beam-deflecting unit is translationally moveable along a line extension direction of the one-line array, the beam-deflecting unit being configured such that, when located in the first position, it deflects the optical path of each optical channel having a first portion into a first direction and, when located in the second position, it deflects the optical path of each optical channel having a second portion into a second direction different therefrom.

According to another embodiment, a multi-aperture imaging device may have: a one-line array of adjacently arranged optical channels, each including optics for projecting a respective partial field of view on an image sensor area of an image sensor; and a beam-deflecting unit for deflecting an optical path of the optical channels; wherein the beam-deflecting unit having a first position and a second position between which the beam-deflecting unit is translationally moveable along a line extension direction of the one-line array, the beam-deflecting unit being configured such that it deflects the optical path of each optical channel into mutually different directions depending on whether it is located in the first position or in the second position; wherein the optical channels include, in an area of the beam-deflecting unit along the line extension direction, a mutual distance which amounts to at least a dimension of an optical channel, the beam-deflecting unit including a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction; wherein the plurality of first beam-deflecting elements is allocated to the optical channels and allows to capture a first total field of view, and the second plurality of beam-deflecting elements allocated to the optical channels allows to capture a second total field of view being different from the first one; wherein the optics of the optical channels or slopes of the beam-deflecting unit direct the optical channels within the viewing direction to different partial fields of view of the respective total field of view.

According to another embodiment, a multi-aperture imaging device may have: a one-line array of adjacently arranged optical channels, each including optics for projecting a respective partial field of view on an image sensor area of an image sensor; and a beam-deflecting unit for deflecting an optical path of the optical channels; wherein the beam-deflecting unit has a first position and a second position between which the beam-deflecting unit is translationally moveable along a line extension direction of the one-line array, the beam-deflecting unit being configured such that, when located in the first position, it deflects the optical path of each optical channel having a first portion into a first direction and, when located in the second position, it deflects the optical path of each optical channel having a second portion into a second direction different therefrom; wherein the beam-deflecting unit has at least a third position and is translationally moveable between the first, the second and the third positions along a line extension direction of the one-line array, the beam-deflecting unit being configured such that it deflects the optical path of each optical channel into mutually different directions depending on whether it is located in the first position, in the second position or the in at least third position.

Another embodiment may have a an inventive multi-aperture imaging device or may have: a one-line array of adjacently arranged optical channels, each including optics for projecting a respective partial field of view on an image sensor area of an image sensor; and a beam-deflecting unit for deflecting an optical path of the optical channels; wherein the beam-deflecting unit has a first position and a second position between which the beam-deflecting unit is translationally moveable along a line extension direction of the one-line array, the beam-deflecting unit being configured such that it deflects the optical path of each optical channel into mutually different directions depending on whether it is located in the first position or in the second position; wherein the optical channels include, in an area of the beam-deflecting unit along the line extension direction, a mutual distance which amounts to at least a dimension of an optical channel, the beam-deflecting unit including a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction; wherein the plurality of first beam-deflecting elements is allocated to the optical channels and allows to capture a first total field of view, and the second plurality of beam-deflecting elements allocated to the optical channels allows to capture a second total field of view being different from the first one; wherein the optics of the optical channels or slopes of the beam-deflecting unit direct the optical channels within the viewing direction to different partial fields of view of the respective total field of view.

Another embodiment may have a an inventive multi-aperture imaging device or may have: a one-line array of adjacently arranged optical channels, each including optics for projecting a respective partial field of view on an image sensor area of an image sensor; and a beam-deflecting unit for deflecting an optical path of the optical channels; wherein the beam-deflecting unit has a first position and a second position between which the beam-deflecting unit is translationally moveable along a line extension direction of the one-line array, the beam-deflecting unit being configured such that, when located in the first position, it deflects the optical path of each optical channel having a first portion into a first direction and, when located in the second position, it deflects the optical path of each optical channel having a second portion into a second direction different therefrom; wherein the beam-deflecting unit has at least a third position and is translationally moveable between the first, the second and the third positions along a line extension direction of the one-line array, the beam-deflecting unit being configured such that it deflects the optical path of each optical channel into mutually different directions depending on whether it is located in the first position, in the second position or the in at least third position.

According to an embodiment, a method of producing a multi-aperture imaging device may have the steps of: providing a one-line array of adjacently arranged optical channels each including optics; and arranging a beam-deflecting unit for deflecting an optical path of the optical channels; arranging an optical image stabilizer for performing image stabilization along a first image axis by producing a rotational movement of the beam-deflecting unit, and for translationally moving the one-line array along a line extension direction based on a translational movement for performing image stabilization along a second image axis; so that the beam-deflecting unit has a first position and a second position between which the beam-deflecting unit is translationally moveable along a line extension direction of the one-line array, and such that the beam-deflecting unit, when located in the first position, deflects the optical path of each optical channel having a first portion into a first direction and, when located in the second position, it deflects the optical path of each optical channel having a second portion into a second direction different therefrom.

According to another embodiment, a method of producing a multi-aperture imaging device may have the steps of: providing a one-line array of adjacently arranged optical channels, each including optics for projecting a respective partial field of view on an image sensor area of an image sensor; and arranging a beam-deflecting unit for deflecting an optical path of the optical channels; so that the beam-deflecting unit has a first position and a second position between which the beam-deflecting unit is translationally moveable along a line extension direction of the one-line array, and so that the beam-deflecting unit deflects the optical path of each optical channel into mutually different directions depending on whether it is located in the first position or in the second position; so that the optical channels include, in an area of the beam-deflecting unit along the line extension direction, a mutual distance which amounts to at least a dimension of an optical channel, and so that the beam-deflecting unit includes a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction; so that the plurality of first beam-deflecting elements is allocated to the optical channels and allows to capture a first total field of view, and the second plurality of beam-deflecting elements allocated to the optical channels allows to capture a second total field of view being different from the first one; and so that the optics of the optical channels or slopes of the beam-deflecting unit direct the optical channels within the viewing direction to different partial fields of view of the respective total field of view.

According to another embodiment, a method of producing a multi-aperture imaging device may have the steps of: providing a one-line array of adjacently arranged optical channels, each including optics for projecting a respective partial field of view on an image sensor area of an image sensor; and arranging a beam-deflecting unit for deflecting an optical path of the optical channels; so that the beam-deflecting unit has a first position and a second position between which the beam-deflecting unit is translationally moveable along a line extension direction of the one-line array, and so that the beam-deflecting unit, when located in the first position, deflects the optical path of each optical channel having a first portion into a first direction and, when located in the second position, it deflects the optical path of each optical channel having a second portion into a second direction different therefrom; so that the beam-deflecting unit has at least a third position and is translationally moveable between the first, the second and the third positions along the line extension direction of the one-line array, the beam-deflecting unit being configured such that it deflects the optical path of each optical channel into mutually different directions depending on whether it is located in the first position, in the second position or the in at least third position.

One finding of the present invention consists in having realized that arranging optical channels in a one-line array enables miniaturizing a multi-aperture imaging device along a direction perpendicular to a line extension direction of the one-line array up to an extent of the one line. One side, which is miniaturized due to the one-line design of the array, of the multi-aperture imaging device may be aligned essentially in parallel with a side, which is to be miniaturized, of a device so that degrees of freedom are obtained when the device is implemented by the miniaturized side. By the beam-deflecting means, deflection of optical paths of the optical channels in any direction may be achieved, so that orientation of the optical channels with regard to an object area to be captured may be random, which enables further degrees of freedom and enables the imaging device to be miniaturized along at least one direction.

In accordance with an embodiment, a multi-aperture imaging device includes a one-line array of adjacently arranged optical channels and beam-deflecting means for deflecting an optical path of the optical channels. The beam-deflecting means comprises a first position and a second position between which the beam-deflecting means is translationally moveable along a line extension direction of the one-line array. The beam-deflecting means is configured such that it deflects the optical path of each optical channel into mutually different directions depending on whether it is located in the first position or in the second position.

On the basis of the one-line array, an extension of the multi-aperture imaging device along a direction perpendicular to a line extension direction of the one-line array may be small or minimal.

In accordance with further embodiments, a portable device comprises a multi-aperture imaging device in accordance with embodiments.

In accordance with further embodiments, a method of producing a multi-aperture imaging device comprises providing a one-line array of adjacently arranged optical channels and arranging beam-deflecting means for deflecting an optical path of the optical channels. The beam-deflecting means is arranged such that the beam-deflecting means comprises a first position and a second position between which the beam-deflecting means is translationally moveable along a line extension direction of the one-line array, and so that the beam-deflecting means deflects the optical path of each optical channel into mutually different directions depending on whether it is located in the first position or in the second position.

BRIEF DESCRIPTION OF THE DRAWINGS

Embodiments of the present invention will be detailed subsequently referring to the appended drawings, in which:

FIG. 8 shows a schematic structure including a first multi-aperture imaging device and a second multi-aperture imaging device comprising a shared image sensor.

Figure 1:
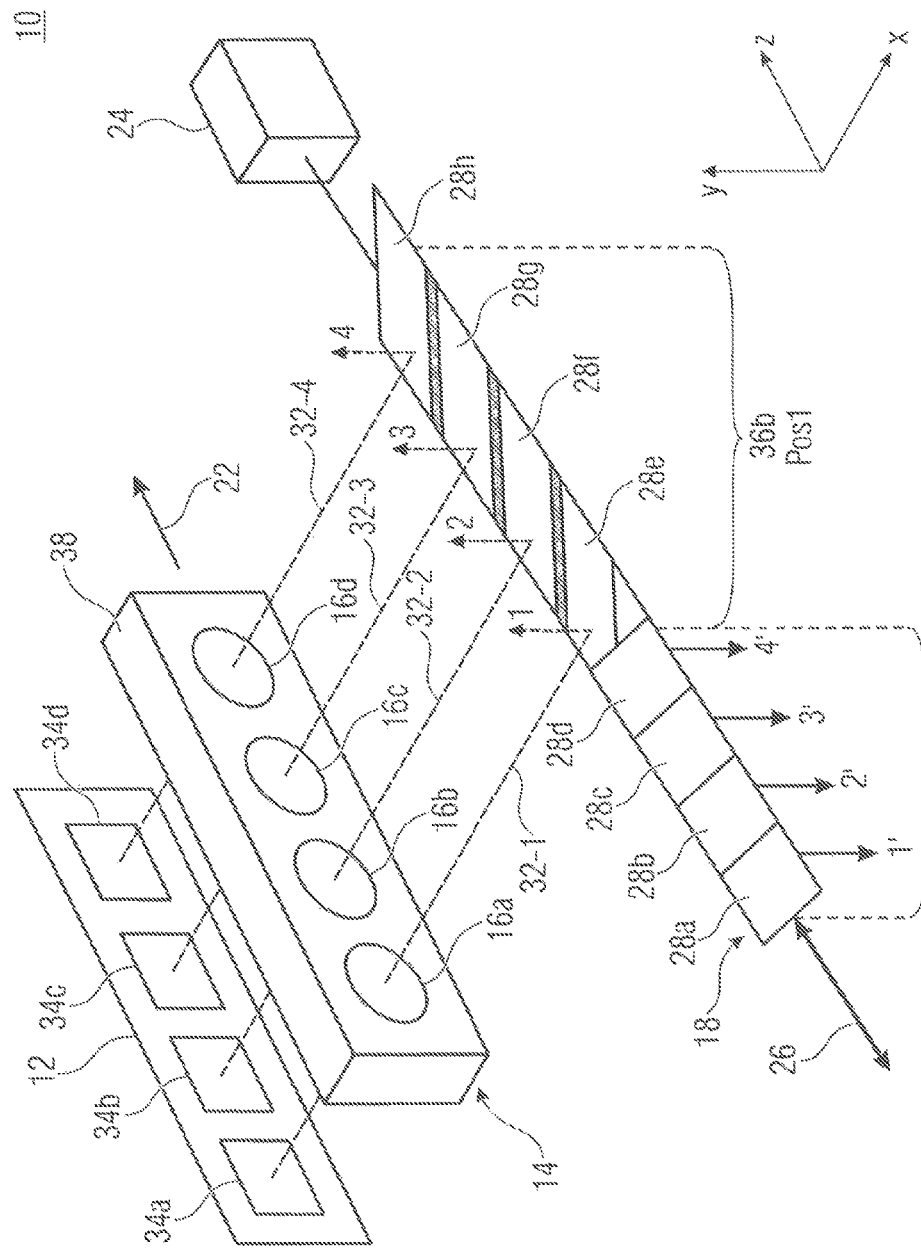
FIG. 1 shows a schematic view of a multi-aperture imaging device in accordance with an embodiment.

Before embodiments of the present invention will be explained in more detail below with reference to the drawings, it shall be noted that elements, objects and/or structures which are identical and have identical functions or actions will be provided with identical reference numerals in the various figures, so that the descriptions, presented in different embodiments, of said elements are interchangeable and/or mutually applicable.

FIG. 1 shows a schematic view of a multi-aperture imaging device 10 in accordance with an embodiment. The multi-aperture imaging device 10 includes an image sensor 12, a one-line array 14 of optical channels 16a-d and a beam-deflecting means 18. The beam-deflecting means 18 comprises a first position and a second position between which the beam-deflecting means 18 is translationally moveable along a line extension direction 22 of the one-line array. The beam-deflecting means is configured to deflect the optical path of each optical channel 16a-d into mutually different directions depending on whether it is located in the first position or in the second position. For example, an actuator 24 may be configured to move the beam-deflecting means 18 on the basis of a translational movement 26 which is parallel, or antiparallel, to the line extension direction 22. The beam-deflecting means may be implemented as a reflective mirror on one side or on both sides. Mirror surfaces may be implemented to be planar or to be continually or discontinuously curved. Alternatively or additionally, the beam-deflecting means 18 may comprise facets arranged adjacently to one another and implemented to deflect a received optical path into a direction differing from those of other facets. The mirror bodies may further comprise prismatic cross sections.

For example, the beam-deflecting means 18 may include a plurality or multitude of beam-deflecting elements 28a-h. The beam-deflecting elements 28a-h may be oriented differently, e.g., individually or in groups, so that on the basis of a positioning of the beam-deflecting elements 28a-h, one beam-deflecting element 28a or 28e, 28b or 28f, 28c or 28g, and/or 28d or 28h is arranged along an optical path 32-1, 32-2, 32-3 or 32-4 of a respective optical channel 16a-d in each case. For example, the optical paths 32-1 to 32-4 located between the image sensor 12 and the beam-deflecting means 18 may extend essentially in a mutually parallel (in a collimated) manner. For example, the beam-deflecting elements 28e-h may comprise mutually different inclinations and/or reflection characteristics, so that the optical paths 32-1 to 32-4 are directed into different directions at the beam-deflecting elements 28e-h. The different directions may extend up to mutually differing partial fields of view of a total field of view to be captured, different partial fields of view being captured via different optical channels 16a-d and across different image sensor areas 34a-d of the image sensor 12. As is indicated by the designations 1, 1', 2, 2', 3, 3', 4 and 4', the optical paths 32-1 to 32-4 of the optical channels 16a-d may be deflected into mutually different viewing directions by the deflecting means 18. A first viewing direction may at least partly extend in a positive y direction, for example. A second viewing direction may at least partly extend in a negative y direction, for example. If the deflecting means 18 is in a second position, the beam-deflecting elements 28a-d may be arranged before the one-line array 14 so as to deflect the optical paths 32-1 to 32-4 of the optical channels 16a-d. The beam-deflecting elements 28a-d may be arranged such that they deflect the optical paths 32-1 to 32-4 along a negative y direction. The first and second viewing directions may be arbitrary on the basis of an alignment (angle) of the beam-deflecting elements with regard to the one-line array 14. In accordance with an embodiment, the viewing directions extend along different sides, or main sides, of the multi-aperture imaging device 10.

The beam-deflecting elements 28a-h may be facets, e.g., of a beam-deflecting means 18 formed as a facet mirror. This means that the beam-deflecting means may be formed as an array of facets arranged along the line extension direction 22. Alternatively or additionally, a first portion 36a of the beam-deflecting means 18 may be configured to be essentially curved in sections. A second portion 36b may also be configured to be curved in sections, mutually different section-by-section curvatures possibly enabling differing deflections of the optical paths 32-1 to 32-4. This means that the beam-deflecting elements 28a-d, 28e-h, and/or 28a-h may be interconnected, in sections, in a continuous or discontinuous manner. In a first position, the portion 36b may be arranged to deflect the optical paths 32-1 to 32-4. In the second position, the portion 36a may be configured to deflect the optical paths 32-1 to 32-4. This enables a flat configuration of the multi-aperture imaging device 10 along the y direction, which may also be understood to be the thickness direction or may extend in parallel therewith. On the basis of the beam-deflecting means 18, an arrangement of a second image sensor and/or of a second array of optical channels may be dispensed with for capturing mutually different fields of view (object areas). On the basis of the translational movement of the beam-deflecting means, reserving an installation space for the movement of the beam-deflecting means along the thickness direction may be partly or completely dispensed with, so that a large degree of miniaturization is possible. An arrangement of the areas or blocks 36b and 36a, respectively, for deflecting the optical paths 32-1 to 32-4 may be understood to be a first position Pos1 and a second position Pos2, respectively, of the beam-deflecting means 18.

The actuator 24 may be configured, e.g., as a pneumatic actuator, as a hydraulic actuator, as a piezoelectric actuator, as a direct-current motor, as a stepper motor, as a thermally actuated actuator, as an electrostatic actuator, as an electrostrictive actuator, as a magnetostrictive actuator or as a voice-coil drive.

The one-line array 18 may comprise a carrier 38, for example, through which the optical channels 16a-d pass. For this purpose, the carrier 38 may be configured to be opaque, for example, and may comprise transparent areas for the optical channels 16a-d. Within or adjacently to the transparent areas and/or at end areas thereof, the optics of the optical channels 16a-d may be arranged. Alternatively or additionally, the carrier 38 may be configured to be transparent, for example on the basis of a polymer material and/or a glass material. Optics (lenses) of the optical channels 16a-d, which enable projection of the respective partial field of view of the total field of view on the respective image sensor area 34a-d of the image sensor 12, may be arranged on a surface of the carrier 38. What is advantageous about this is that a dimension of the optical channels 16a-d and/or of the multi-aperture imaging device 10 may depend on a dimension (diameter) of the optics arranged along the thickness direction. The carrier 38 may essentially have a same dimension along the thickness direction as do the optics, so that a small amount of or no additional installation space needs to be provided along the thickness direction for the carrier 38 of the one-line array 14.

The image sensor areas 34a-d may each be formed from a chip, for example, which includes a corresponding pixel array; the image sensor areas may be mounted on a shared substrate and/or a shared circuit board. Alternatively, it would also be possible, of course, for the image sensor areas 34a-d to each be formed from part of a shared pixel array continually extending across the image sensor areas 34a-d, the shared pixel array being formed, e.g., on an individual chip. For example, only the pixel values of the shared pixel array will then be read out in the image sensor areas 34a-d. Various combinations of said alternatives are also possible, of course, such as the presence of one chip for two or more channels and of a further chip for yet other channels or the like. In the case of several chips of the image sensor 12, said chips may be mounted on one or more circuit boards, for example all together or in groups or the like.

Figure 2:
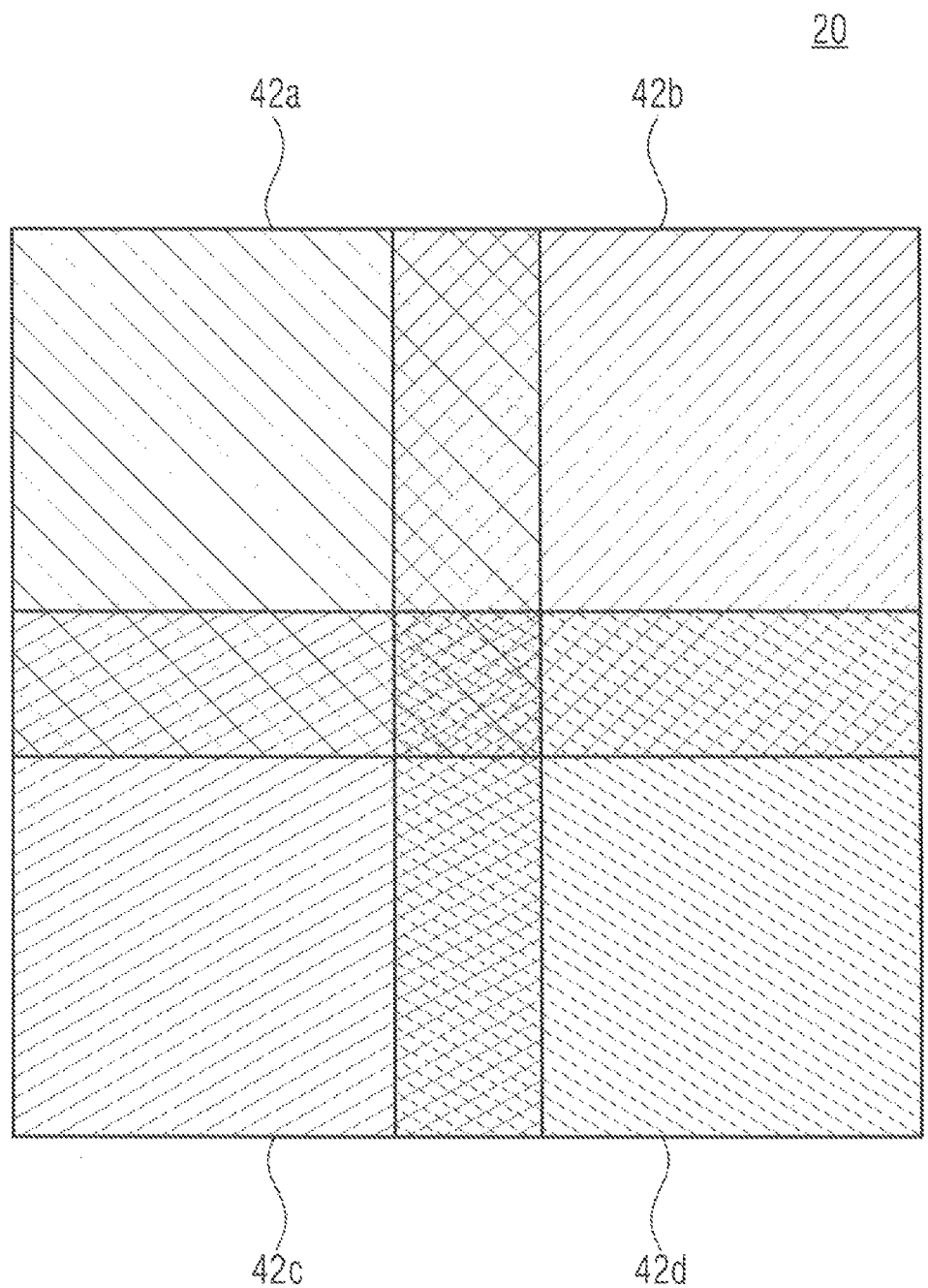
FIG. 2 shows a schematic view of a total field of view 20 including four partial fields of view in accordance with an embodiment.

FIG. 2 shows a schematic view of a total field of view 20 including four partial fields of view 42a-d. The partial fields of view 42a-d may be associated with the optical channels 16a-d, for example. A number of partial fields of view may be larger and/or smaller and be based, for example, on a number of optical channels within a multi-aperture imaging device. With regard to FIG. 1, for example, the optical path 32-1 may be directed toward the partial field of view 42a, the optical path 32-2 may be directed toward the partial field of view 42b, the optical path 32-3 may be directed toward the partial field of view 42c, and/or the optical path 32-4 may be directed toward the partial field of view 42d. Even though an association between optical paths 32-1 to 32-4 with the partial fields of view 42a-d is arbitrary, it becomes clear that the optical paths 42-1 to 42-4 are directed into mutually different directions on the basis of the beam-deflecting means 18.

This means that the optical channels may be configured to capture mutually overlapping partial fields of view of the total field of view 20. The optical paths 32-1 to 32-4 may exhibit, on a side of the beam-deflecting means 18 which faces away from the image sensor 12, an identical viewing direction and different inclinations or angles within the same viewing direction. The different inclinations enable capturing of different partial fields of view of the total field of view. The different inclinations may be obtained by the beam-deflecting means 18 and/or by the optics of the optical channels 16a-d.

Figure 3:
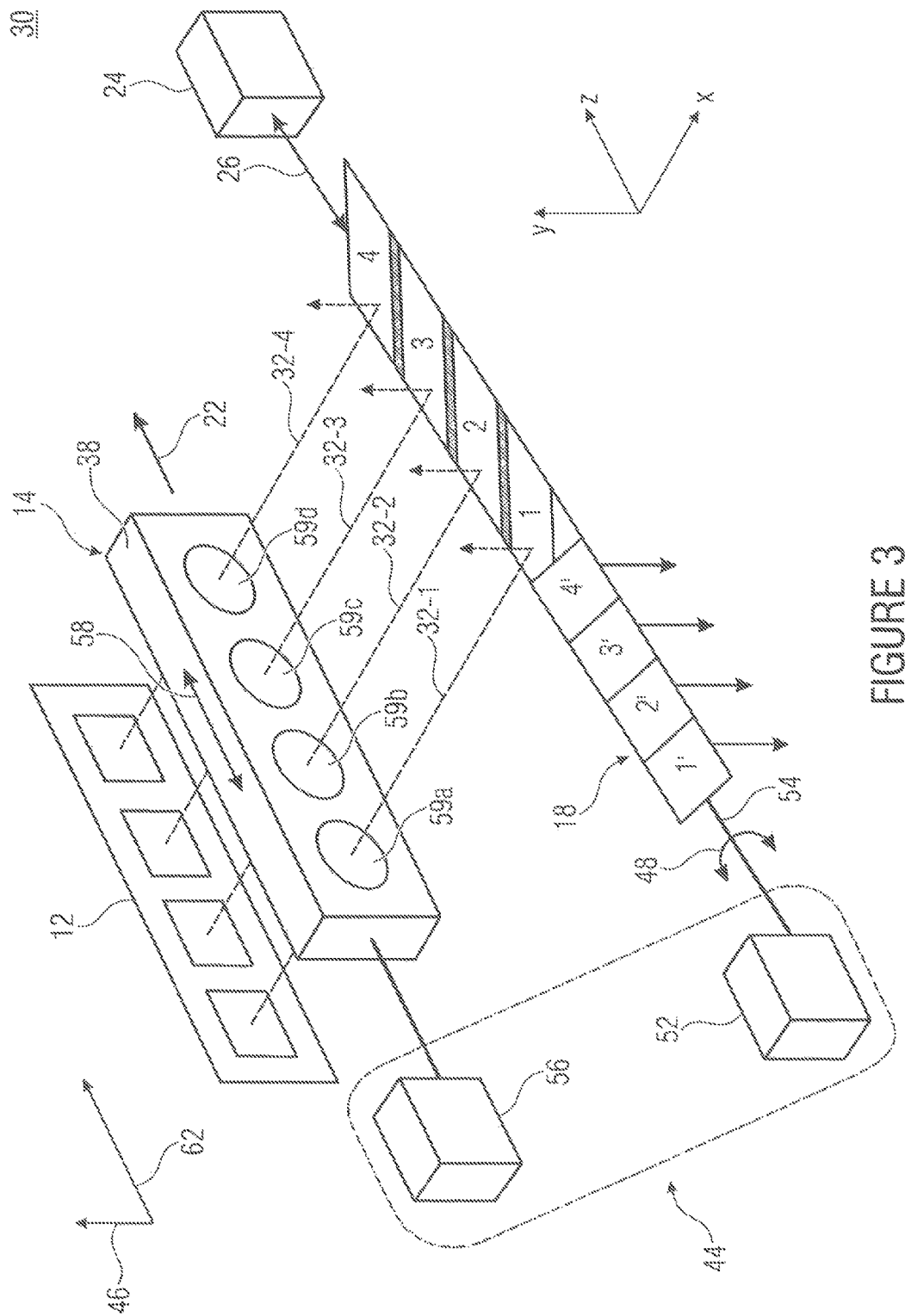
FIG. 3 shows a schematic view of a multi-aperture imaging device in accordance with an embodiment which includes an optical image stabilizer.

FIG. 3 shows a schematic view of a multi-aperture imaging device 30 modified in relation to the multi-aperture imaging device 10 in that the multi-aperture imaging device 30 includes an optical image stabilizer for image stabilizing an image axis 46 by generating a rotational movement 48 of the beam-deflecting means 18. The image stabilizer 44 may include an actuator 52 configured to generate the rotational movement 48. To this end, the actuator 52 may be mechanically connected to the beam-deflecting means 18. The actuator 52 may be configured to generate the rotational movement 48 in an analogous manner. This may be understood to mean that, for example, between the first position, the second position, and/or further positions of the beam-deflecting means 18 along the translational movement 26, one may switch in an essentially positionally discrete manner, and that the positions of the beam-deflecting means may be configured to be stable in one, two or several directions. This may be understood to mean positionally discrete positions between which the beam-deflecting means 18 is moved. The translational movement 26 may be superimposed by the analogous rotational movement 48; the analogous movement may be understood to be positionally continuous or to at least have a step size which is substantially smaller than that of the translational movement 26. The rotational movement 48 may be generated, for example, about a rotational axis 54 of the beam-deflecting means 18. The axis of rotation 54 may be arranged in parallel with the line extension direction 22 of the one-line array. The rotational movement 48 of the beam-deflecting means 18 may be configurable, for example, within a range of angles of ±15°, ±10° or ±1° about a standard position. On the basis of the rotation or tilting of the beam-deflecting means 18, the optical image stabilization may be obtained along the image axis 46, which is spatially arranged, e.g., perpendicularly to the line extension direction 22. The rotational movement 48 may have an identical or comparable effect that would be obtained if the one-line array 14 were moved, in relation to the image sensor 12, along a direction perpendicular to the line extension direction 22 and parallel to the image sensor 12. On the basis of the rotational movement 48, however, such a translational movement may be avoided, so that reservation of installation space along the direction that is perpendicular to the line extension direction 22 and parallel to the image sensor 12 for moving the image sensor 12 or the one-line array 14 may be avoided. In simplified terms, the optical image stabilization along the image axis 46 may be implemented without any additional installation space along a height direction or thickness direction, e.g. the y direction, which is advantageous.

The optical image stabilizer 44 may include a further actuator 56 configured to translationally move the one-line array 14 along the line extension direction 22 on the basis of a translational movement 58. The translational movement 58 may enable image stabilization along a second image axis 62. The image axes 48 and 62 may be arranged perpendicularly to each other and may describe, e.g., extension directions of an image to be captured. The actuators 52 and/or 56 may be formed as pneumatic actuators, as hydraulic actuators, as piezo-electric actuators, as direct-current motors, as stepper motors, as thermally actuated actuators, as electrostatic actuators, as electrostrictive actuators, magnetostrictive actuators or as voice-coil drives, for example.

In accordance with further embodiments, the actuator 56 and/or other actuators may be configured to change a distance between the image sensor 12 and the one-line array 14, and/or between the image sensor 12 and the optics 59*a-d* of the optical channels. To this end, for example, the actuator 56 may be configured to move the one-line array 14 along an optical path of the optical paths 32-1 to 32-4 and/or perpendicularly to the line extension direction 22, so as to change a focus of the imaging of the field of view and/or to obtain an autofocus function. In addition, the actuator 56 or a further actuator may be configured to keep a distance between the one-line array 14 and the beam-deflecting means 18 at least essentially constant or, when no additional actuator is used, at least essentially constant, possibly precisely constant, i.e. to move the beam-deflecting means 18 as much as the one-line array 14 is moved. With cameras comprising no beam-deflecting means, implementation of a focus function may result in an increased dimension (thickness) of the device. On the basis of the beam-deflecting means, this may occur without any additional dimension resulting along a dimension that is parallel to a main side of the image sensor 12 and perpendicular to the line extension direction 22 (e.g. a thickness along the y direction) of the multi-aperture imaging device since an installation space which enables the movement may be arranged to be perpendicular thereto. On the basis of a constant distance between the one-line array 14 and the beam-deflecting means 18, beam deflection may be maintained in an adjusted (possibly optimum) state. In simplified terms, the imaging device 30 may comprise focusing means for changing a focus. The focusing means may be configured to provide a relative movement (focusing movement) between at least one optic 59*a-d* of the optical channels of the multi-aperture imaging device 30 and the image sensor 12. The focusing means may comprise an actuator for providing the relative movement, for example the actuator 56 and/or 52 and/or further actuators. The beam-deflecting means 18 may be moved along, on account of corresponding constructive configuration or utilization of a further actuator, simultaneously with the focusing movement. This means that a distance between the one-line array 14 and the beam-deflecting means remains unchanged and/or that the beam-deflecting means 18 is moved, at the same time or with a time lag, to a same or comparable extent as the focusing movement occurs, so that it is unchanged, as compared to a distance prior to a change of focus, at least at a point in time when the field of view is captured by the multi-aperture imaging device.

The optics 59*a-d* may be arranged on a main side of the carrier 38. The carrier 38 may keep a relative position between the optics 59*a-d* stable. The carrier 38 may be configured to be transparent and may include, e.g., a glass material and/or a polymer material. The optics 59*a-d* may be arranged on at least one surface of the carrier 38. The carrier 38 may be passed through by the optical paths 32-1 to 32-4 used for imaging in the individual optical channels. The optical channels of the multi-aperture imaging device may traverse the carrier 38 between the beam-deflecting means 18 and an image sensor 12. This enables a small dimension of the carrier 38 and, consequently, of the one-line array 14 along a direction that is in parallel with the image sensor 12 and perpendicular to the line extension direction 22, or along the y direction, since enclosure of the optics 59*a-d* within a circumferential area of same may be dispensed with. In accordance with embodiments, the carrier 38 is configured to not be larger, or is configured to be only marginally larger, i.e. by a maximum of 20%, by a maximum of 10% or by a maximum of 5%, than a corresponding dimension of the optic 59*a-d* along the direction that is parallel to a main side of the image sensor 12 and perpendicular to the line extension direction 22.

Figure 4:
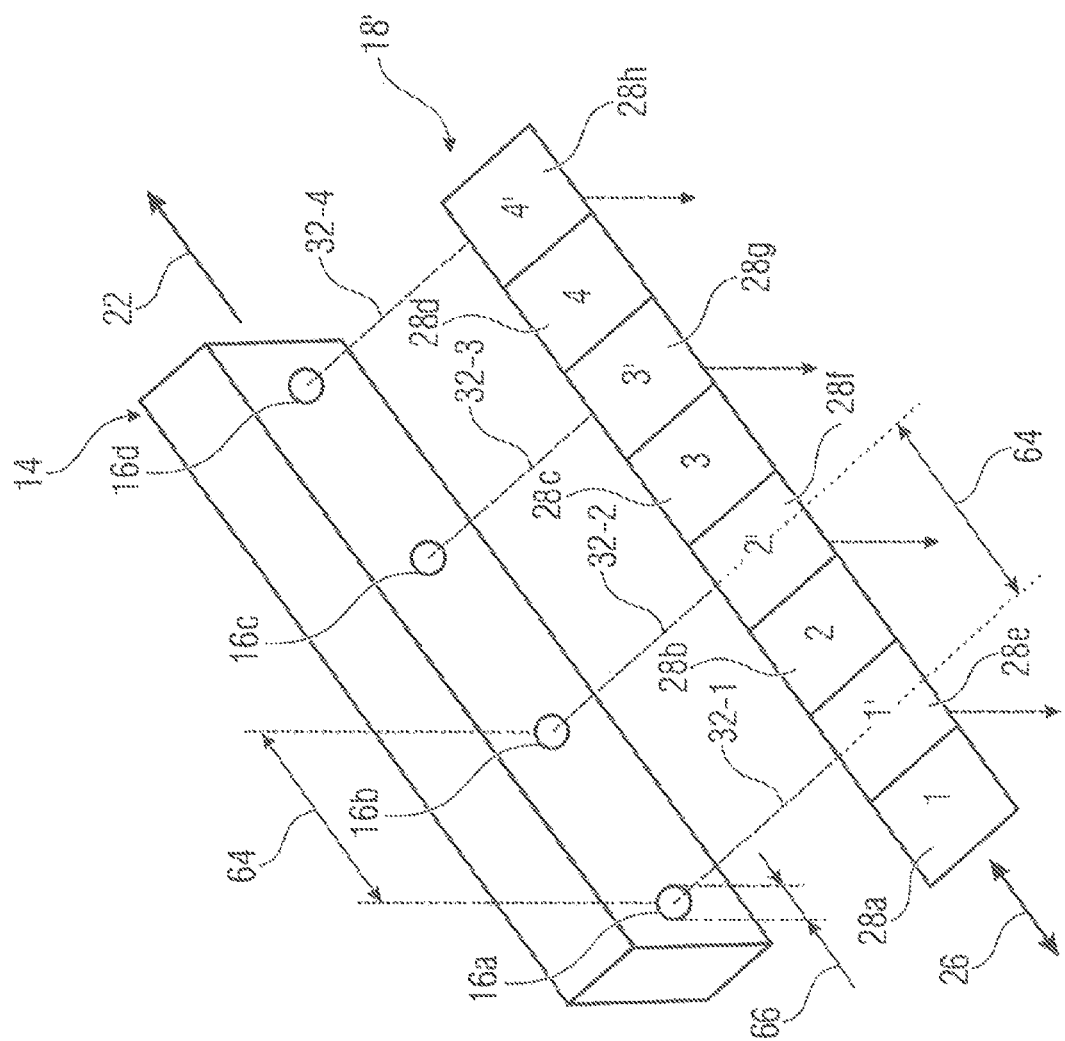
FIG. 4 shows a schematic view of a one-line array and a beam-deflecting means in accordance with an embodiment.

FIG. 4 shows a schematic view of the one-line array 14 and of the beam-deflecting means 18'. The one-line array 14 may be formed such that the optical channels 16*a-d* and/or optical paths 32-1 to 32-4 passing through them have a mutual distance 64 within an area of the beam-deflecting means 18 along the line extension direction 22. The distance 64 may have at least a dimension 66 of an optical channel 16*a*, 16*b*, 16*c* or 16*d* of an optical channel along the line extension direction 22. The beam-deflecting means 18' may be formed such that beam-deflecting elements 28*a* and 28*e*, 28*b* and 28*f*, 28*c* and 28*g* and/or 28*d* and 28*h*, which are associated with an optical channel 16*a-d*, are arranged to be mutually adjacent. This may be understood to mean that first beam-deflecting elements 28*a-d*, which may be associated with the optical channels 16*a-d* and enable capturing of a first total field of view, and second beam-deflecting elements 28*e-h*, which may be associated with the optical channels 16*a-d* and enable capturing of a second total field of view different from the first field of view, are alternatingly arranged, along the line extension direction 22, within or at the beam-deflecting means 18'. On the basis of a position of the respective field of view, the deflection of the optical paths 32-1 to 32-4 may be understood as being mutually different viewing directions of the multi-aperture imaging device toward the respective field of view. In simplified terms, a beam-deflecting element which is unused in the current operating state or at a current position may be located between two optical channels 16*a* and 16*b*, 16*b* and 16*c*, and 16*c* and 16*d*, respectively. Such an arrangement enables the translational movement 26 for switching between the first position and the second position to be based on a shorter distance covered, for example as compared to a distance covered by the translational movement 26 as depicted in FIG. 1, and where the distance covered may correspond, e.g., to a length of a block 36*a* or 36*b* along the line extension direction 22, the translational movement may be smaller and may amount to, e.g., half or a quarter thereof. On the basis of the alternating arrangement, a reduction of the installation space of a multi-aperture imaging device along the line extension direction may thus be obtained. For example, the beam-deflecting means 18' may be arranged within the multi-aperture imaging device 10 or 30, alternatively or additionally to the beam-deflecting means 18.

Figure 5:
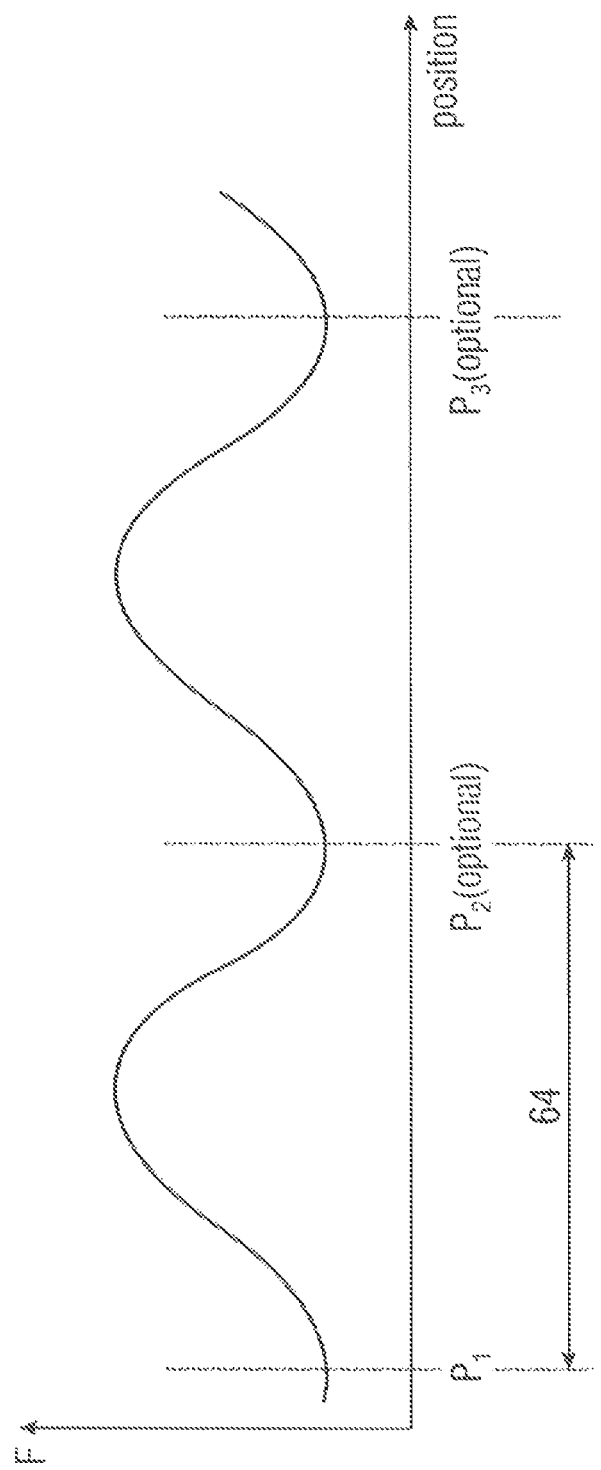
FIG. 5 shows a schematic diagram of a curve of forces across a movement of the beam-deflecting means across a translational movement and in accordance with an embodiment.

FIG. 5 shows a schematic diagram of a curve of forces across a movement of the beam-deflecting means 18 or 18' across the translational movement 26. The position of a fixed point of the beam-deflecting means along the line extension direction 22 is plotted on the abscissa. The ordinate of the graph shows a force of an actuator for moving the beam-deflecting means into positive and negative line extension directions, respectively. The movement of the beam-deflecting means may be effected to be stable in one, two or several directions. For example, stable positions $P_1$, $P_2$ and/or $P_3$ may be understood to mean that the force diagram exhibits a local minimum at the respective position. A distance between two stable positions, for example between the position $P_1$ and the position $P_2$, may correspond to the distance 64, for example, as is described in the context of FIG. 4. This means that a distance between two stable positions $P_1$ and $P_2$ may correspond to a distance between two optical channels along the line extension direction.

Positions which are stable in one, two or several directions may be obtained, for example, in that the actuator 24 is configured as a stepper motor. For example, if the beam-deflecting means is configured to be moved to and fro between two positions, one of the positions $P_1$ or $P_2$ may be, or be based on, an idle position of the actuator, for example. The actuator may be configured, e.g., to perform the translational movement 26 toward a spring force which, when the respectively other position is reached, exerts a counter force which returns the beam-deflecting means to its starting position when the force of the actuator is removed. This means that a stabile position may be obtained also in such areas of the force diagram which exhibit no local minimum of forces. For example, this may be a maximum of forces. Alternatively or additionally, a stable position may be obtained on the basis of magnetic or mechanical forces between the beam-deflecting means 18 and an adjacent housing or substrate. This means that the actuator 24, for translationally moving the beam-deflecting means, may be configured to move the beam-deflecting means into a position which is stable in two or several directions. Alternatively, simple mechanical stops may be provided, for bi-stable arrangements of the positions, which define two end positions between which position switching is performed in the defined end locations.

If the beam-deflecting means has a third position, for example the position $P_2$ or a stable or unstable position different therefrom, and if the beam-deflecting means is arranged to be translationally moveable between the first, second and third positions $P_1$, $P_2$ and $P_3$ along the line extension direction of the one-line array, the beam-deflecting means may be configured such that it will deflect the optical path of each optical channel into mutually different directions depending on whether it is located in the first position, the second position or in the third position. The position of the beam-deflecting means may at least partly determine a viewing direction of the multi-aperture imaging device toward mutually different total fields of view. Optics of the optical channels or inclinations of the beam-deflecting means may direct the optical channels within the viewing direction into different partial fields of view of the respective total field of view. With regard to FIG. 1, the beam-deflecting means 18 may include, for example, further beam-deflecting elements which exhibit orientations that differ from those of the beam-deflecting elements 28a-d and 28e-h, respectively.

In accordance with further embodiments, the beam-deflecting means may be translationally moved between more than three positions.

Figure 6:
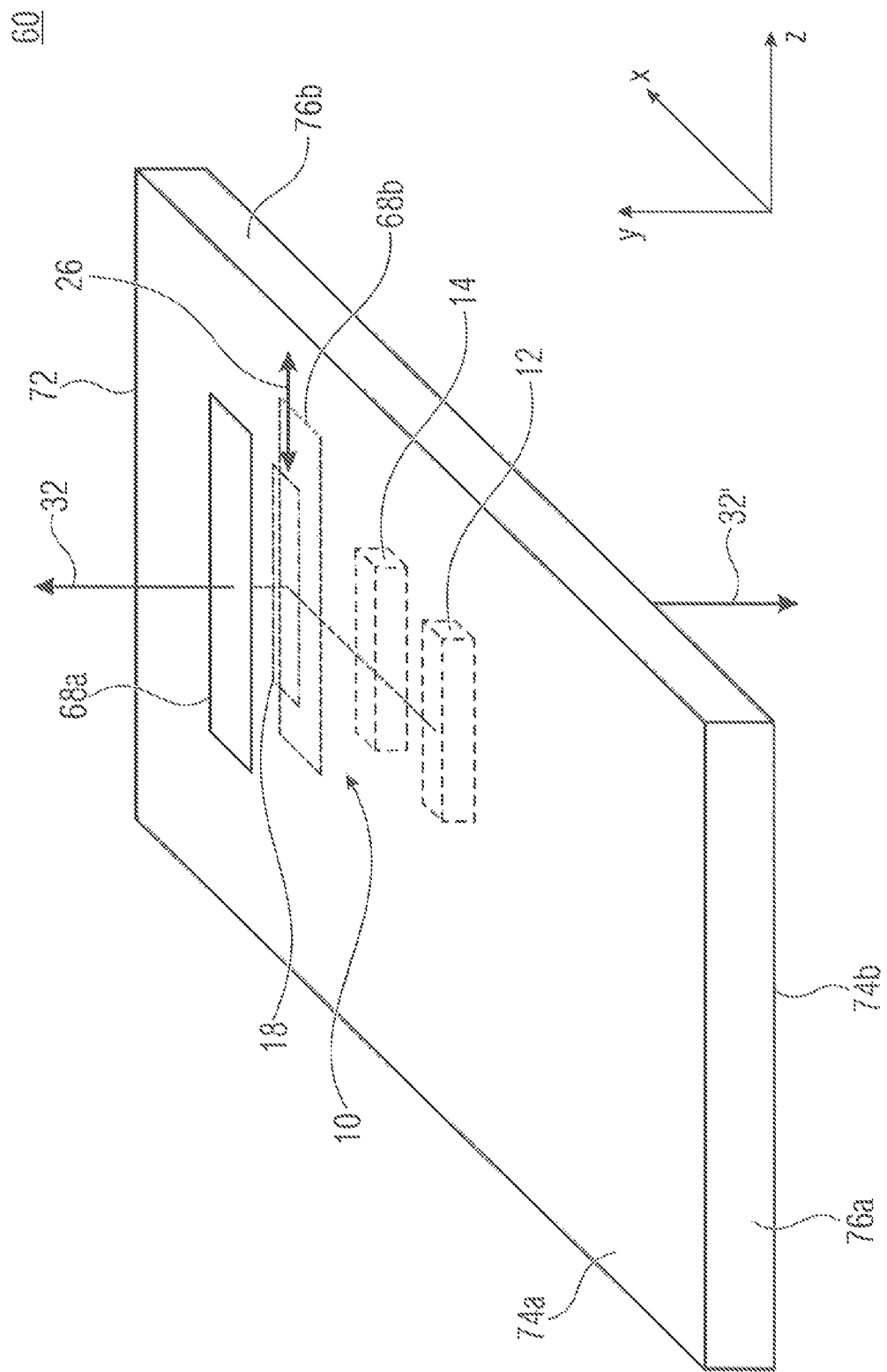
FIG. 6 shows a schematic perspective view of a portable device in accordance with an embodiment.

FIG. 6 shows a schematic perspective view of a portable device 60 which includes the multi-aperture imaging device 10. Alternatively or additionally, the portable device 60 may also include other multi-aperture imaging devices, such as the multi-aperture imaging device 30. The portable device 60 may be configured as a communication device, for example, such as a mobile phone (smartphone), a tablet computer or a mobile music player.

On the basis of the multi-aperture imaging device 10, capturing of fields of view along different directions of the portable device may be enabled by means of a multi-aperture imaging device. For example, an optical path 32 of the optical channels of the multi-aperture imaging device may be deflected along a first viewing direction on the basis of the first position of the beam-deflecting means 18. This may be a positive y direction, for example. The optical path may be deflected along a different viewing direction on the basis of the second position of the beam-deflecting means 18, as is indicated by the optical path 32'. This may be a negative y direction, for example. E.g., the optical paths 32 and/or 32' may exit a housing of the portable device 60 through transparent areas 68a and/or 68b. What is advantageous about this is that the components of image sensor, one-line array of optical channels and the beam-deflecting means may be arranged within one plane, which is arranged orthogonally to an actual capturing direction (e.g. positive or negative y direction). Alternatively or additionally, an oblique or tilted arrangement of the plane is also possible, for example when at least one viewing direction comprises an angle differing from 90° or differing from 180° in relation to a different viewing direction.

On the basis of the beam-deflecting means 18 and of the arrangement, described herein, of the components of the array 14 and the image sensor 12, the housing 72 may be configured to be flat. This means that an extension along a thickness direction or a distance between two main sides 74a and 74b of the housing 72 may be small when compared to the extension of the housing along different spatial directions. The main sides 74a and 74b may be, e.g., those sides or faces of the housing 72 which have large or largest surface areas. For example, however, without being limited thereto, they may be a front side and a rear side. Lateral or secondary faces 76a and 76b may connect the main sides 74a and 74b with each other; an extension of the secondary sides 76a and 76b from a main side 74a or 74b toward the other main side 74b or 74a may be understood to be the thickness of the housing 72 or of the portable device, for example. The y direction may be understood to be the thickness direction, for example. An extension of the housing 72 along other directions, e.g. the x direction and/or the z direction, for example, may amount to at least three times, at least five times or at least seven times the extension along the thickness direction.

Figure 7:
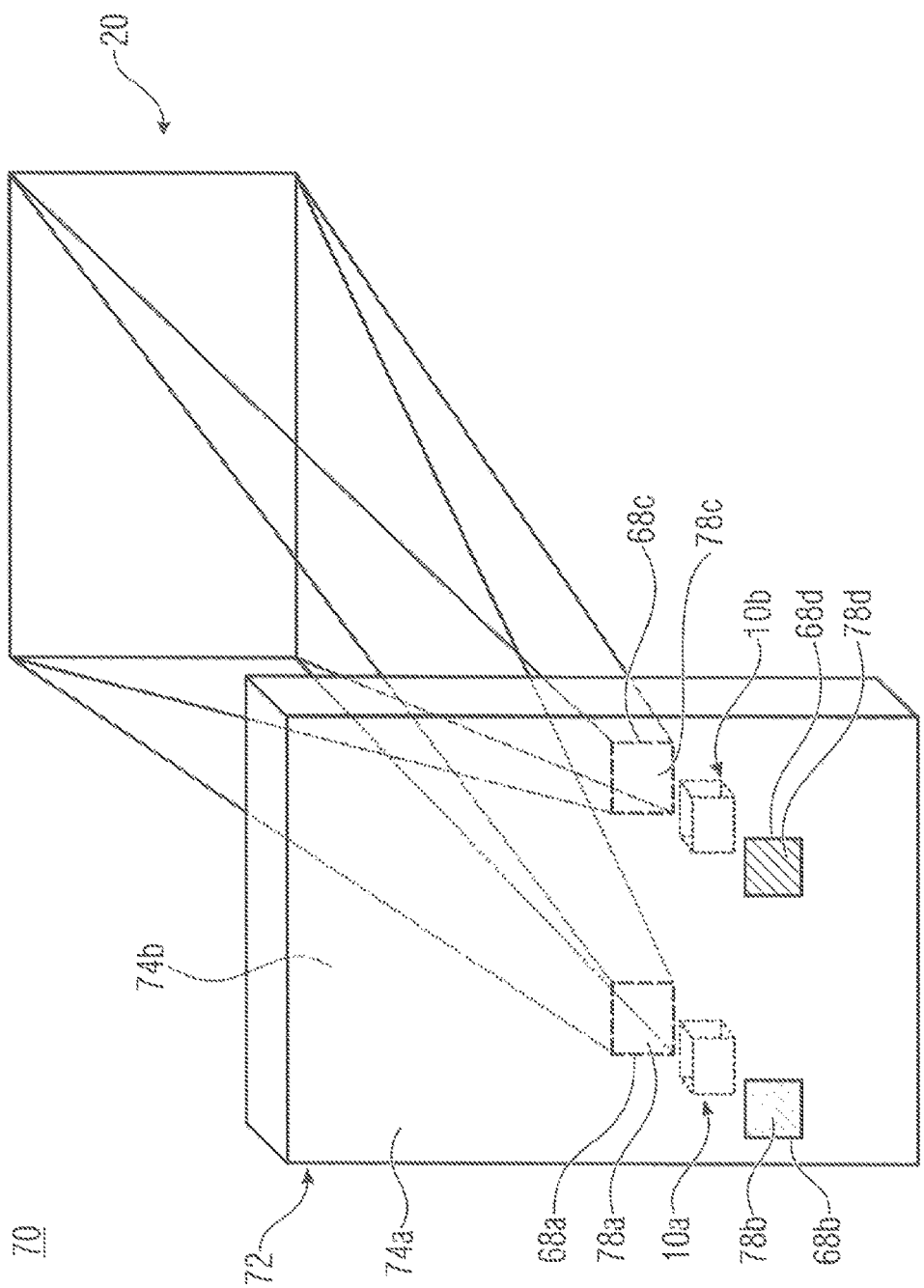
FIG. 7 shows a schematic perspective view of a portable device including two multi-aperture imaging devices in accordance with an embodiment.

FIG. 7 shows a schematic perspective view of a portable device 70 which includes a first multi-aperture imaging device 10a and a second multi-aperture imaging device 10b and is configured to stereoscopically capture the total field of view 20 by means of the multi-aperture imaging devices. The total field of view 20 is arranged, e.g., on a main side 74b facing away from the main side 74a. For example, the multi-aperture imaging devices 10a and 10b may capture the total field of view 20 through transparent areas 68a and/or 68c; diaphragms 78a and 78c arranged within the main side 74b being at least partly transparent. Diaphragms 78b and 78d arranged within the main side 74a may at least partly optically close transparent areas 68b and 68d, respectively, so that an amount of stray light from a side facing the main side 74a, which stray light may distort the shots of the multi-aperture imaging devices 10a and/or 10b, is at least reduced. Even though the multi-aperture imaging devices 10a and 10b are arranged to be spaced apart from each other in the drawing, the multi-aperture imaging devices 10a and 10b may also be arranged to be spatially adjacent or combined. For example, the one-line arrays of the imaging devices 10a and 10b may be arranged next to or in parallel with each other. The one-line arrays may form mutual lines, each multi-aperture imaging device 10a and 10b comprising a one-line array. The imaging devices 10a and 10b may comprise a shared beam-deflecting means and/or a shared carrier 38 and/or a shared image sensor 12. Alternatively or additionally to the multi-aperture imaging device 10a and/or 10b, the multi-aperture imaging device 30 may be arranged.

The transparent areas 68a-d may additionally be equipped with a switchable diaphragm 78a-d which covers the optical structure for the event of non-utilization. The diaphragm 78a-d may include a mechanically movable part. The movement of the mechanically movable part may be effected while using an actuator, as is described, for example, for actuators 24, 52 and 56. Alternatively or additionally, the diaphragm 78a-d may be electrically controllable and include an electrochromic layer or an electrochromic layer sequence, i.e. be formed as an electrochromic diaphragm.

In principle, any number of submodules including image sensor(s), imaging optic(s) and mirror array(s) may be arranged. Submodules may also be configured as a system. The submodules or systems may be installed within a housing such as a smart phone, for example. The systems may be arranged in one or more lines and/or rows and at any desired location. For example, two imaging devices 10 may be arranged within the housing 72 so as to enable stereoscopic capturing of a field of view.

In accordance with further embodiments, the device 70 includes further multi-aperture imaging devices 10 and/or 30, so that the total field of view 20 may be scanned by means of more than two multi-aperture imaging devices. This enables a number of partially overlapping channels which capture the total field since their viewing directions are adapted channel by channel. For capturing the total field of view in a stereoscopic manner or in a manner comprising a higher order, at least one further arrangement of channels may be arranged in accordance with embodiments described herein and/or with the described arrangement of channels, which may take shape as precisely one line or as separate modules. This means that the one-line array may comprise a first portion and a second portion, it being possible for the portions to be associated with a first and, respectively, a second multi-aperture imaging device which differs from the first multi-aperture imaging device. The optical channels of the further line may also capture respectively overlapping partial areas and together cover the total field of view. This enables obtaining a stereo, trio, quattro, etc. structure of array cameras consisting of channels which partly overlap and which cover the total field of view within their subgroup.

FIG. 8 shows a schematic structure including a first multi-aperture imaging device 10a and a second multi-aperture imaging device 10b as may be arranged within the imaging system 70, for example. The arrays 14a and 14b are formed to comprise one line each, and form a shared line. The image sensors 12a and 12b may be mounted on a shared substrate, or a shared circuit carrier such as a shared circuit board or a shared flex board. Alternatively, the image sensors 12a and 12b may also comprise mutually different substrates. Various combinations of said alternatives are also possible, of course, such as multi-aperture imaging devices which include a shared image sensor, a shared array and/or a shared beam-deflecting means 18 as well as further multi-aperture imaging devices comprising separate components. What is advantageous about a shared image sensor, a shared array and/or a shared beam-deflecting means is that a movement of a respective component may be achieved with a large amount of precision by controlling a small number of actuators and that synchronization between actuators may be reduced or avoided. Moreover, a large amount of thermal stability may be achieved. Alternatively or additionally, other and/or mutually different multi-aperture imaging devices 10 and/or 30 may also comprise a shared array, a shared image sensor and/or a shared beam-deflecting means.

A method of producing a multi-aperture imaging device includes providing a one-line array of adjacently arranged optical channels and arranging a beam-deflecting means for deflecting an optical path of the optical channels. The beam-deflecting means is arranged such that the beam-deflecting means has a first position and a second position between which the beam-deflecting means may be translationally moved along a line extension direction of the one-line array, and such that the beam-deflecting means deflects the optical path of each optical channel into mutually different directions depending on whether it is located in the first position or in the second position.

In other words, multi-aperture cameras comprising a linear channel arrangement may include several optical channels arranged adjacently to one another and transmitting or capturing parts of the total field of view, respectively. In accordance with embodiments, a mirror (beam-deflecting means) may be advantageously arranged before the imaging lenses (optics of the optical channels), which mirror may be used for beam deflection and may contribute to reducing the installation height.

This means that actuators may be arranged such that they are arranged at least partly between two planes defined by sides of a cuboid. The sides of the cuboid may be aligned in parallel so as to be parallel with one another and parallel with the line extension direction of the array and part of the optical path of the optical channels between the image sensor and the beam-deflecting means. The volume of the cuboid is minimal and nevertheless includes the image sensor, the array and the beam-deflecting means as well as their operation-dependent movements.

A thickness direction of the multi-aperture imaging device may be arranged perpendicularly to the planes and/or in parallel with the y direction. The actuators may comprise a dimension or extension that is in parallel with the thickness direction. A proportion of a maximum of 50%, a maximum of 30% or a maximum of 10% of the dimension may project beyond the plane, starting from an area located between the planes, or project from said area. For example, the actuators thus protrude beyond the plane to a marginal extent at the most. In accordance with embodiments, the actuators do not protrude beyond the planes. What is advantageous about this is that an extension of the multi-aperture imaging device along the thickness direction is not increased by the actuators.

A volume of the multi-aperture imaging device may comprise a small or minimum installation space between the defined planes. Along the lateral sides or extension directions of the planes, an installation space of the multi-aperture imaging device may be large or have any size desired. The volume of the virtual cuboid is influenced, for example, by an arrangement of the image sensor, of the one-line array and of the beam-deflecting means; the arrangement of these components in accordance with the embodiments described herein may be effected such that the installation space of these components along the direction perpendicular to the planes and, consequently, the distance of the planes and with regard to one another become small or minimal. As compared to other arrangements of the components, the volume and/or the distance of other sides of the virtual cuboid may be increased.

In combination with a beam-deflecting means (facet mirror) adapted channel-by-channel—the facets may be planar or exhibit any curvature or be provided with a freeform surface—it may advantageously be possible for the imaging optics of the channels to be designed in an essentially identical manner, whereas the viewing directions of the channels are predefined or influenced by the individual facets of the mirror array. The deflection mirror may be translatorily moved, the direction of movement extending perpendicularly to the optical axes of the channels, i.e. along the line extension direction. The deflection mirror may be reflective on one side, for example, it being possible for metallic or dielectric layer sequences to be arranged. The deflection mirror comprises, e.g. a number of facets that is larger than that of optical channels which are configured within the imaging module (carrier). In accordance with an embodiment, the number of facets may be a multiple of the number of optical channels. Said multiple may match the number of positions of the beam-deflecting means along the translational movement or a number of viewing directions of the multi-aperture imaging device. In accordance with a further embodiment, the number of beam-deflecting elements may differ from a multiple of the optical channels. At least one beam-deflecting element may be formed or arranged in a position of the beam-deflecting means so as to deflect optical paths from at least two optical channels.

The translatory movement of the mirror may be effected in a manner that is stable in two or several directions, i.e. positionally discrete manner; a smallest step size may correspond, in accordance with embodiments, to a distance of two imaging channels. Alternatively, the translatory movement of the mirror may also be effected in an analogous, i.e. positionally continuous, manner or may comprise a step size that is smaller than a distance between two positions. The translatory movement of the mirror may be used for switching the viewing direction of the camera (imaging device). For example, one may switch between the viewing directions of front, left, right, top, bottom and/or rear in relation to the display; the directional terms are randomly exchangeable or adaptable and are not intended to have any limiting effect.

The deflection mirror (beam-deflecting means) may additionally be pivoted; the axis of rotation may extend perpendicularly to the optical axes, possibly in parallel with the line extension direction of the optical channels. Rotation of the mirror may be effected in an analogous manner. Analogous rotation of the mirror may be usable for one-dimensional adaptation of the image location so as to enable optical image stabilization. Here, a movement by a few degrees may be sufficient, for example by a maximum of ±15°, by a maximum of ±10° or by a maximum of ±1°. The analogous translatory movement which is stable in two or several directions or is analogous may be combined with the rotary movement of the image stabilization. In particular, previous solutions used in mobile devices such as smartphones, for example, which utilize two cameras with a front viewing direction and a rear viewing direction, may be replaced by a structure comprising a switchable viewing direction. This structure is additionally characterized, unlike previous solutions, in that the viewing window (transparent area) may be arranged within the housing for the cameras with front and rear viewing directions at the same position, but within upper and lower housing covers, i.e. in an opposite manner. Alternatively or additionally, further multi-aperture imaging devices may be arranged, for example, so as to enable a total field of view to be captured in a stereoscopic manner. Areas of the housing covers which are passed through by the optical path, e.g. 68a and 68b, may be transparent and may comprise, in the event that visible light is used, e.g. glass materials and/or polymer materials.

Any number of submodules, i.e. multi-aperture imaging devices which consist of at least one image sensor, imaging optics and mirror arrays, may be usable. Said submodules may be structured as one system, for example. The submodules may be installed within a housing, such as a smartphone, for example. The submodules may be arranged within one or several lines and/or rows or at any desired positions. Additionally, switchable diaphragms may be arranged adjacently to the transparent areas 68a and/or 68b or in an area located before and/or behind the transparent areas 68a and/or 68b along a beam direction of the optical channels, which additional switchable diaphragms cover the transparent area in the event of a non-utilization or in the event that a different transparent area is used, i.e. they may at least partly optically close the transparent area. The diaphragm may be or include a mechanically movable part. The movement may be enabled while using actuator principles described herein. Alternatively or additionally, the diaphragm may be an electrochromic diaphragm, may be electrically controllable and/or may include one or more electrochromic layers, or layer sequences.

Embodiments described herein enable a reduction of the installation height of multi-aperture imaging devices by using a multi-aperture approach with a linear channel arrangement. This enables saving a second and/or further camera for capturing a further total field of view on the basis of a beam deflection with a mirror (beam-deflecting means).

On the basis of an analogous mirror tilting for one-dimensional optical image stabilization, image quality may be increased. This enables a simplified overall structure, combined with lower manufacturing costs and a reduced installation size of the overall system.

Embodiments described herein may be employed for multi-aperture imaging systems each comprising a linear channel arrangement and a minimum installation size.

It was already pointed out above that starting from the beam-deflecting means, the optical paths and/or optical axes may be directed into mutually different directions. This may be achieved in that the optical paths are directed during deflection at the beam-deflecting means and/or by the optics in deviation from being mutually parallel. The optical paths and/or optical axes may deviate from being parallel prior to, or without any, beam deflection. This circumstance will be circumscribed below by the fact that the channels may be provided with some kind of pre-divergence. With said pre-divergence of the optical axes it would be possible that, e.g., not all of the facet inclinations of facets of the beam-deflecting means differ from one another but that some groups of channels comprise, e.g., the facets having equal inclinations or are directed to same. The latter may then be formed to be integral or to continually merge into one another as a facet, as it were, which is associated with said group of channels adjacent in the line extension direction.

The divergence of the optical axes of these channels might then originate from the divergence of these optical axes as is achieved by a lateral offset between optical centers of the optics of the optical channels and image sensor areas of the channels. The pre-divergence might be limited to a plane, for example. The optical axes might extend, e.g., within a shared plane prior to, or without any, beam deflection, but extend in a divergent manner within said plane, and the facets cause only an additional divergence within the other transversal plane, i.e. they are all inclined in parallel with the line extension direction and are mutually inclined only in a manner that is different from the above-mentioned shared plane of the optical axes; here, again, several facets may have the same inclination and/or be commonly associated with a group of channels whose optical axes differ pair by pair, e.g. already within the above-mentioned shared plane of the optical axes, prior to or without any beam deflection. In simplified terms, the optics may enable a (pre-) divergence of the optical paths along a first (image) direction, and the beam-deflecting means may enable a divergence of the optical paths along a second (image) direction.

The above-mentioned possibly existing pre-divergence may be achieved, for example, in that the optical centers of the optics lie on a straight line along the line extension direction, whereas the centers of the image sensor areas are arranged such that they deviate from the projection of the optical centers along the normal of the plane of the image sensor areas onto points that lie on a straight line within the image sensor plane, for example at points which deviate from the points that lie on the above-mentioned straight line within the image sensor plane, in a channel-specific manner, along the line extension direction and/or along the direction perpendicular to both the line extension direction and the image sensor normal. Alternatively, pre-divergence may be achieved in that the centers of the image sensors lie on a straight line along the line extension direction, whereas the centers of the optics are arranged to deviate from the projection of the optical centers of the image sensors along the normal of the plane of the optical centers of the optics onto points that lie on a straight line within the optic center plane, for example at points which deviate from the points that lie on the above-mentioned straight line within the optical center plane, in a channel-specific manner, along the line extension direction and/or along the direction perpendicular to both the line extension direction and the normal of the optical center plane. The above-mentioned channel-specific deviation from the respective projection may take place only in the line extension direction, i.e. that the optical axes which are located merely within a shared plane be provided with a pre-divergence. Both optical centers and image sensor area centers will then each be located on a straight line in parallel with the line extension direction, but with different intermediate gaps. A lateral offset between lenses and image sensors in the lateral direction perpendicular to the line extension direction would therefore result in an increase in the installation height. A mere in-plane offset in the line extension direction does not change the installation height but might possibly result in a reduced number of facets and/or in that the facets are tilted only in an angle orientation, which simplifies the design. For example, optical channels which are adjacent in each case may comprise optical axes which extend within the shared plane and are squinting in relation to one another, i.e. are provided with a pre-divergence. A facet may be arranged, with regard to a group of optical channels, to be inclined merely in one direction and to be parallel to the line extension direction.

Moreover, provision might be made for some optical channels to be associated with the same partial field of view, e.g. for the purpose of achieving a super-resolution and/or for increasing the resolution with which the corresponding partial field of view is scanned by said channels. The optical channels within such a group would then extend in parallel, e.g. prior to beam deflection, and would be deflected onto a partial field of view by one facet. Advantageously, pixel images of the image sensor of a channel of one group would be located at intermediate positions between images of the pixels of the image sensor of another channel of this group.

What would also be feasible, for example, even without any super-resolution purposes, but only for stereoscopy purposes, would be an implementation wherein a group of directly adjacent channels fully cover the total field of view with their partial fields of view in the line extension direction, and that a further group of mutually directly adjacent channels, for their part, fully cover the total field of view.

The above embodiments thus may be implemented in the form of a multi-aperture imaging device and/or of a system including such a multi-aperture imaging device, specifically with a one-line channel arrangement, wherein each channel transmits a partial field of view of a total field of view and wherein the partial fields of view partly overlap. A design comprising several such multi-aperture imaging devices for stereo, trio, quattro, etc. designs for 3D imaging is possible. In this context, most modules may be implemented as one contiguous line. The contiguous line might benefit from identical actuators and a shared beam-deflecting element. One or more amplifying substrates that might possibly exist within the optical path may extend across the entire line, which may form a stereo, trio, quattro design. Super-resolution methods may be employed, several channels imaging the same partial image areas. The optical axes may extend in a divergent manner already without any beam-deflecting device, so that fewer facets on the beam-deflecting unit are needed. The facets will then advantageously only exhibit one angular component. The image sensor may be in one part, comprise only one contiguous pixel matrix or several interrupted ones. The image sensor may be composed of many partial sensors which are arranged, e.g., adjacently to one another on a printed circuit board. An autofocus drive may be configured such that the beam-deflecting element is moved synchronously with the optics or is idle.

Even though embodiments described herein describe an arrangement of four optical channels for capturing four partial fields of view of a total field of view, a different number of optical channels for capturing a same or different number of partial fields of view may be arranged. In accordance with embodiments, a multi-aperture imaging device comprises at least two, at least three, at least four or at least ten or more optical channels to capture at least two, at least three, at least four or at least ten or more partial fields of view of the total field of view, a partial field of view being capturable by at least one optical channel.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-aperture imaging device comprising:
   a one-line array of adjacently arranged optical channels each comprising optics;
   a beam-deflecting unit for deflecting an optical path of the optical channels;
   an optical image stabilizer for performing image stabilization along a first image axis by producing a rotational movement of the beam-deflecting unit, and for translationally moving the one-line array along a line extension direction based on a translational movement for performing image stabilization along a second image axis; and
   the beam-deflecting unit comprising a first position and a second position between which the beam-deflecting unit is translationally moveable along a line extension direction of the one-line array, the beam-deflecting unit being configured such that, when located in the first position, it deflects the optical path of each optical channel comprising a first portion into a first direction and, when located in the second position, it deflects the optical path of each optical channel comprising a second portion into a second direction different therefrom.

2. The multi-aperture imaging device as claimed in claim 1, wherein the optical image stabilizer is configured to generate the rotational movement by means of an analogous movement.

3. The multi-aperture imaging device as claimed in claim 2, wherein the rotational movement may be superimposed on a translational movement for switching between the first position and the second position.

4. The multi-aperture imaging device as claimed in claim 1, wherein the optical channels comprise, in an area of the beam-deflecting unit along the line extension direction, a mutual distance which amounts to at least a dimension of an optical channel, the beam-deflecting unit comprising a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction.

5. The multi-aperture imaging device as claimed in claim 1, wherein a translational movement of the beam-deflecting unit is performed in a manner that is stable along two or several directions, a distance between two stable positions corresponding to a distance of two optical channels along the line extension direction.

6. The multi-aperture imaging device as claimed in claim 1, comprising a actuator for translationally moving the beam-deflecting unit, the actuator being one of a pneumatic actuator, a hydraulic actuator, a voice-coil motor, a piezoelectric actuator, a DC motor, a stepper motor, an electrostatic actuator, an electrostrictive actuator, a magnetostrictive actuator and a thermal actuator.

7. The multi-aperture imaging device as claimed in claim 1, which comprises an actuator for translationally moving the beam-deflecting unit, the actuator being configured to move the beam-deflecting unit into a position that is stable along two or several directions.

8. The multi-aperture imaging device as claimed in claim 1, wherein the beam-deflecting unit comprises at least a third position and is translationally moveable between the first, the second and the third positions along the line extension direction of the one-line array, the beam-deflecting unit being configured such that it deflects the optical path of each optical channel into mutually different directions depending on whether it is located in the first position, in the second position or the in at least third position.

9. The multi-aperture imaging device as claimed in claim 1, comprising focusing unit for changing a focus, the focusing unit comprising an actuator for providing a relative movement between an optic of one of the optical channels and an image sensor of the multi-aperture imaging device.

10. The multi-aperture imaging device as claimed in claim 9, wherein the focusing unit is configured to perform the relative movement between the optic of one of the optical channels and the image sensor while performing a movement of the beam-deflecting unit that is simultaneous with the relative movement.

11. The multi-aperture imaging device as claimed in claim 1, wherein the optical channels are configured to capture mutually overlapping partial fields of view of a total field of view.

12. The multi-aperture imaging device as claimed in claim 1, wherein the beam-deflecting unit is formed as an array of facets arranged along the line extension direction.

13. The multi-aperture imaging device as claimed in claim 1, further comprising an image sensor for capturing imaging of the optical channels.

14. The multi-aperture imaging device as claimed in claim 1, comprising a transparent carrier, the optical channels traversing the transparent carrier between the beam-deflecting unit and an image sensor of the multi-aperture imaging device.

15. A multi-aperture imaging device comprising:
   a one-line array of adjacently arranged optical channels, each comprising optics for projecting a respective partial field of view on an image sensor area of an image sensor; and
   a beam-deflecting unit for deflecting an optical path of the optical channels;
   wherein the beam-deflecting unit comprises a first position and a second position between which the beam-deflecting unit is translationally moveable along a line extension direction of the one-line array, the beam-deflecting unit being configured such that it deflects the optical path of each optical channel into mutually different directions depending on whether it is located in the first position or in the second position;
   wherein the optical channels comprise, in an area of the beam-deflecting unit along the line extension direction, a mutual distance which amounts to at least a dimension of an optical channel, the beam-deflecting unit comprising a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction;
   wherein the plurality of first beam-deflecting elements is allocated to the optical channels and allows to capture a first total field of view, and the second plurality of beam-deflecting elements allocated to the optical channels allows to capture a second total field of view being different from the first one;

wherein the optics of the optical channels or slopes of the beam-deflecting unit direct the optical channels within the viewing direction to different partial fields of view of the respective total field of view.

16. A multi-aperture imaging device comprising:
a one-line array of adjacently arranged optical channels, each comprising optics for projecting a respective partial field of view on an image sensor area of an image sensor; and
a beam-deflecting unit for deflecting an optical path of the optical channels;
wherein the beam-deflecting unit comprises a first position and a second position between which the beam-deflecting unit is translationally moveable along a line extension direction of the one-line array, the beam-deflecting unit being configured such that, when located in the first position, it deflects the optical path of each optical channel comprising a first portion into a first direction and, when located in the second position, it deflects the optical path of each optical channel comprising a second portion into a second direction different therefrom;
wherein the beam-deflecting unit comprises at least a third position and is translationally moveable between the first, the second and the third positions along a line extension direction of the one-line array, the beam-deflecting unit being configured such that it deflects the optical path of each optical channel into mutually different directions depending on whether it is located in the first position, in the second position or the in at least third position.

17. A device comprising a multi-aperture imaging device as claimed in claim 1 or comprising a one-line array of adjacently arranged optical channels, each comprising optics for projecting a respective partial field of view on an image sensor area of an image sensor; and
a beam-deflecting unit for deflecting an optical path of the optical channels;
wherein the beam-deflecting unit comprises a first position and a second position between which the beam-deflecting unit is translationally moveable along a line extension direction of the one-line array, the beam-deflecting unit being configured such that it deflects the optical path of each optical channel into mutually different directions depending on whether it is located in the first position or in the second position;
wherein the optical channels comprise, in an area of the beam-deflecting unit along the line extension direction, a mutual distance which amounts to at least a dimension of an optical channel, the beam-deflecting unit comprising a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction;
wherein the plurality of first beam-deflecting elements is allocated to the optical channels and allows to capture a first total field of view, and the second plurality of beam-deflecting elements allocated to the optical channels allows to capture a second total field of view being different from the first one;
wherein the optics of the optical channels or slopes of the beam-deflecting unit direct the optical channels within the viewing direction to different partial fields of view of the respective total field of view.

18. A device comprising a multi-aperture imaging device comprising a one-line array of adjacently arranged optical channels, each comprising optics for projecting a respective partial field of view on an image sensor area of an image sensor; and
a beam-deflecting unit for deflecting an optical path of the optical channels;
wherein the beam-deflecting unit comprises a first position and a second position between which the beam-deflecting unit is translationally moveable along a line extension direction of the one-line array, the beam-deflecting unit being configured such that, when located in the first position, it deflects the optical path of each optical channel comprising a first portion into a first direction and, when located in the second position, it deflects the optical path of each optical channel comprising a second portion into a second direction different therefrom;
wherein the beam-deflecting unit comprises at least a third position and is translationally moveable between the first, the second and the third positions along a line extension direction of the one-line array, the beam-deflecting unit being configured such that it deflects the optical path of each optical channel into mutually different directions depending on whether it is located in the first position, in the second position or the in at least third position.

19. The device as claimed in claim 17 comprising at least one further multi-aperture imaging device, the device being configured to capture a total field of view in an at least stereoscopic manner.

20. The device as claimed in claim 18 comprising at least one further multi-aperture imaging device, the device being configured to capture a total field of view in an at least stereoscopic manner.

21. The device as claimed in claim 17, which is configured as a communication device.

22. The device as claimed in claim 18, which is configured as a communication device.

23. A method of producing a multi-aperture imaging device, comprising:
providing a one-line array of adjacently arranged optical channels each comprising optics; and
arranging a beam-deflecting unit for deflecting an optical path of the optical channels;
arranging an optical image stabilizer for performing image stabilization along a first image axis by producing a rotational movement of the beam-deflecting unit, and for translationally moving the one-line array along a line extension direction based on a translational movement for performing image stabilization along a second image axis;
so that the beam-deflecting unit comprises a first position and a second position between which the beam-deflecting unit is translationally moveable along a line extension direction of the one-line array, and such that the beam-deflecting unit, when located in the first position, deflects the optical path of each optical channel comprising a first portion into a first direction and, when located in the second position, it deflects the optical path of each optical channel comprising a second portion into a second direction different therefrom.

24. A method of producing a multi-aperture imaging device, comprising:

providing a one-line array of adjacently arranged optical channels, each comprising optics for projecting a respective partial field of view on an image sensor area of an image sensor; and arranging a beam-deflecting unit for deflecting an optical path of the optical channels;

so that the beam-deflecting unit comprises a first position and a second position between which the beam-deflecting unit is translationally moveable along a line extension direction of the one-line array, and so that the beam-deflecting unit deflects the optical path of each optical channel into mutually different directions depending on whether it is located in the first position or in the second position;

so that the optical channels comprise, in an area of the beam-deflecting unit along the line extension direction, a mutual distance which amounts to at least a dimension of an optical channel, and so that the beam-deflecting unit comprises a plurality of first beam-deflecting elements for acquiring a first viewing direction of the multi-aperture imaging device and a plurality of second beam-deflecting elements for acquiring a second viewing direction of the multi-aperture imaging device, which are alternately arranged along the line extension direction;

so that the plurality of first beam-deflecting elements is allocated to the optical channels and allows to capture a first total field of view, and the second plurality of beam-deflecting elements allocated to the optical channels allows to capture a second total field of view being different from the first one; and so that the optics of the optical channels or slopes of the beam-deflecting unit direct the optical channels within the viewing direction to different partial fields of view of the respective total field of view.

25. A method of producing a multi-aperture imaging device, comprising:

providing a one-line array of adjacently arranged optical channels, each comprising optics for projecting a respective partial field of view on an image sensor area of an image sensor; and arranging a beam-deflecting unit for deflecting an optical path of the optical channels;

so that the beam-deflecting unit comprises a first position and a second position between which the beam-deflecting unit is translationally moveable along a line extension direction of the one-line array, and so that the beam-deflecting unit, when located in the first position, deflects the optical path of each optical channel comprising a first portion into a first direction and, when located in the second position, it deflects the optical path of each optical channel comprising a second portion into a second direction different therefrom;

so that the beam-deflecting unit comprises at least a third position and is translationally moveable between the first, the second and the third positions along the line extension direction of the one-line array, the beam-deflecting unit being configured such that it deflects the optical path of each optical channel into mutually different directions depending on whether it is located in the first position, in the second position or the in at least third position.

* * * * *